L. McCORMICK.
APPARATUS FOR CONTROLLING LIGHT EFFECTS.
APPLICATION FILED APR. 12, 1917.
1,291,964.
Patented Jan. 21, 1919.
5 SHEETS—SHEET 4.
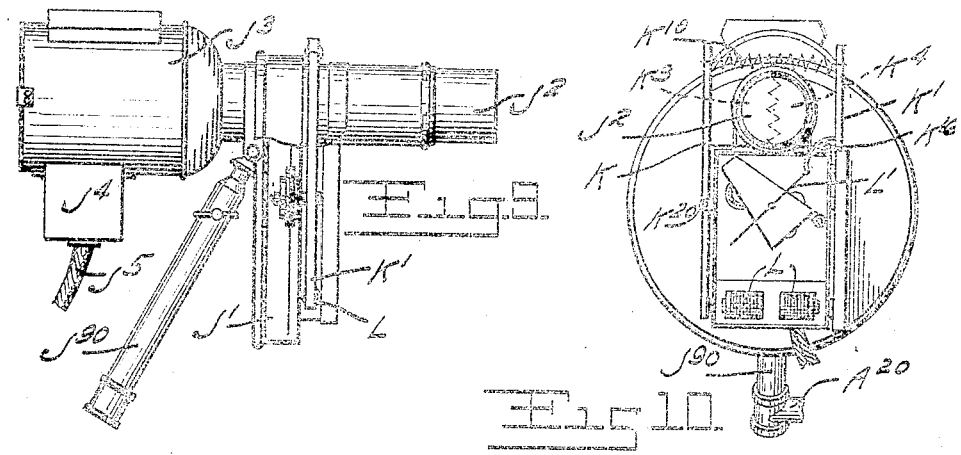
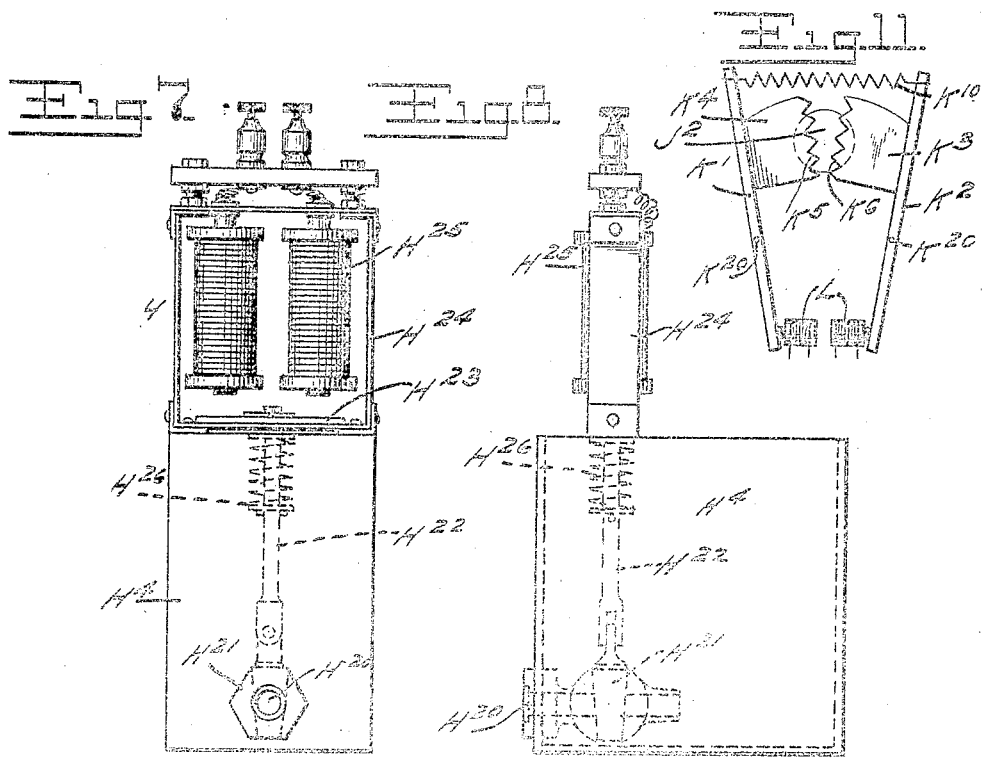
Inventor
L. McCormick.
By his Attorney L. McCORMICK.
APPARATUS FOR CONTROLLING LIGHT EFFECTS.
APPLICATION FILED APR. 12, 1917.

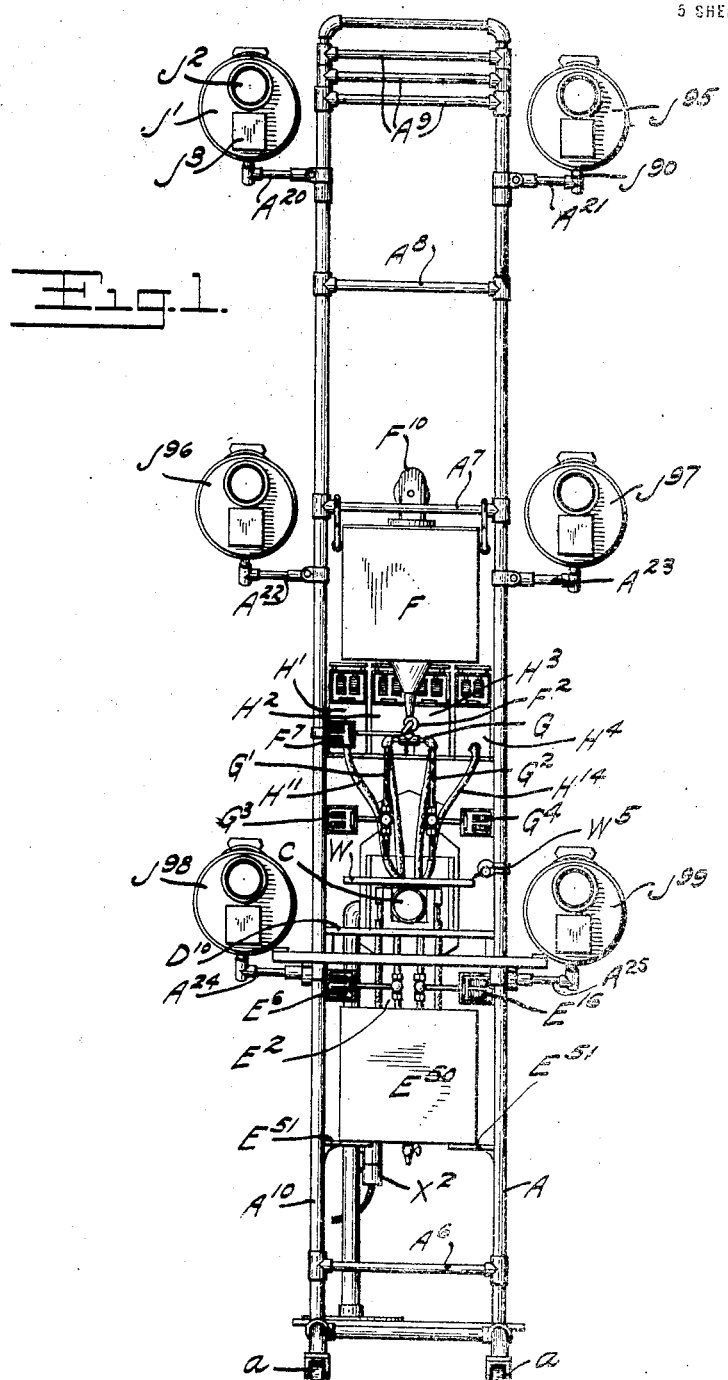

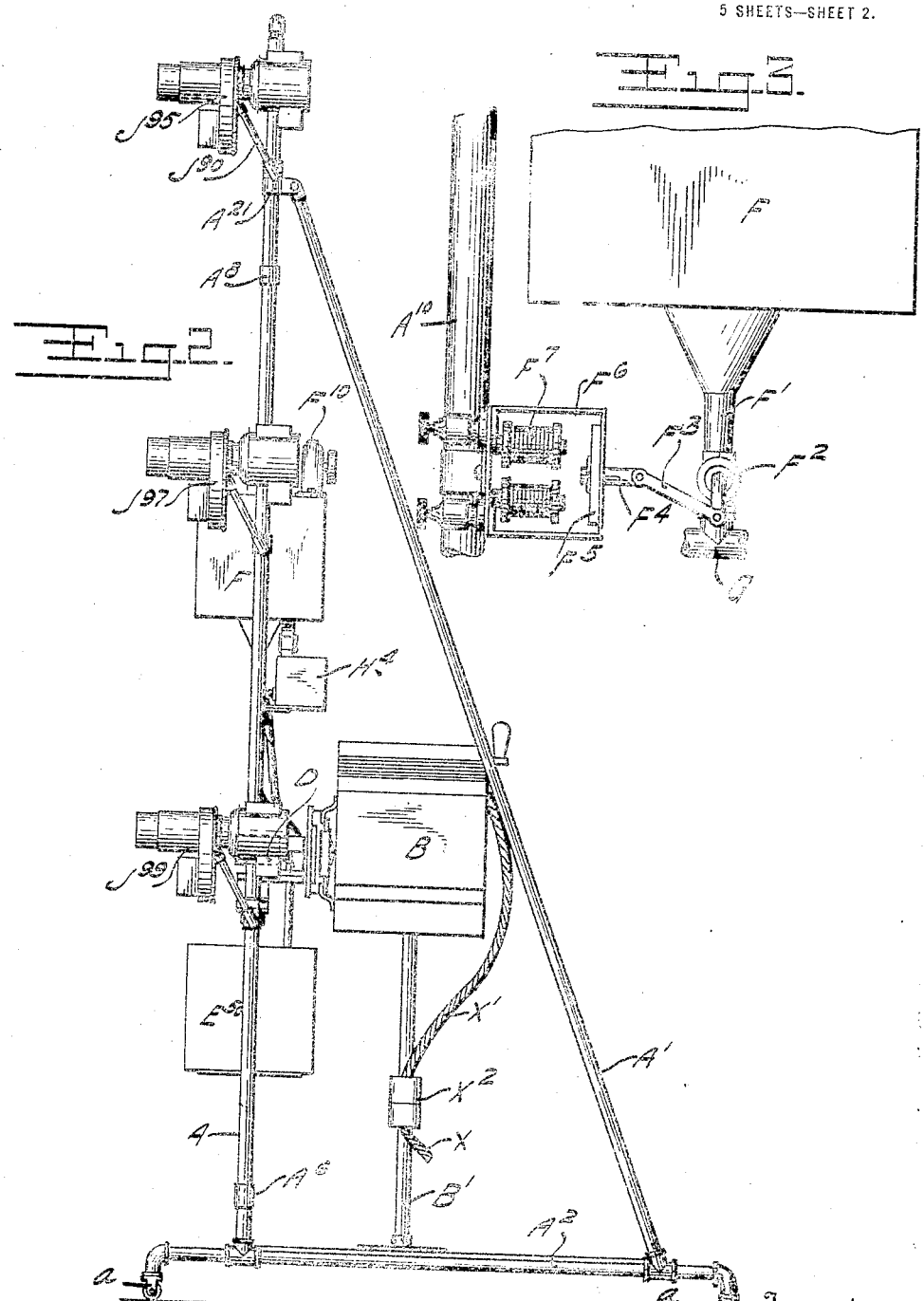

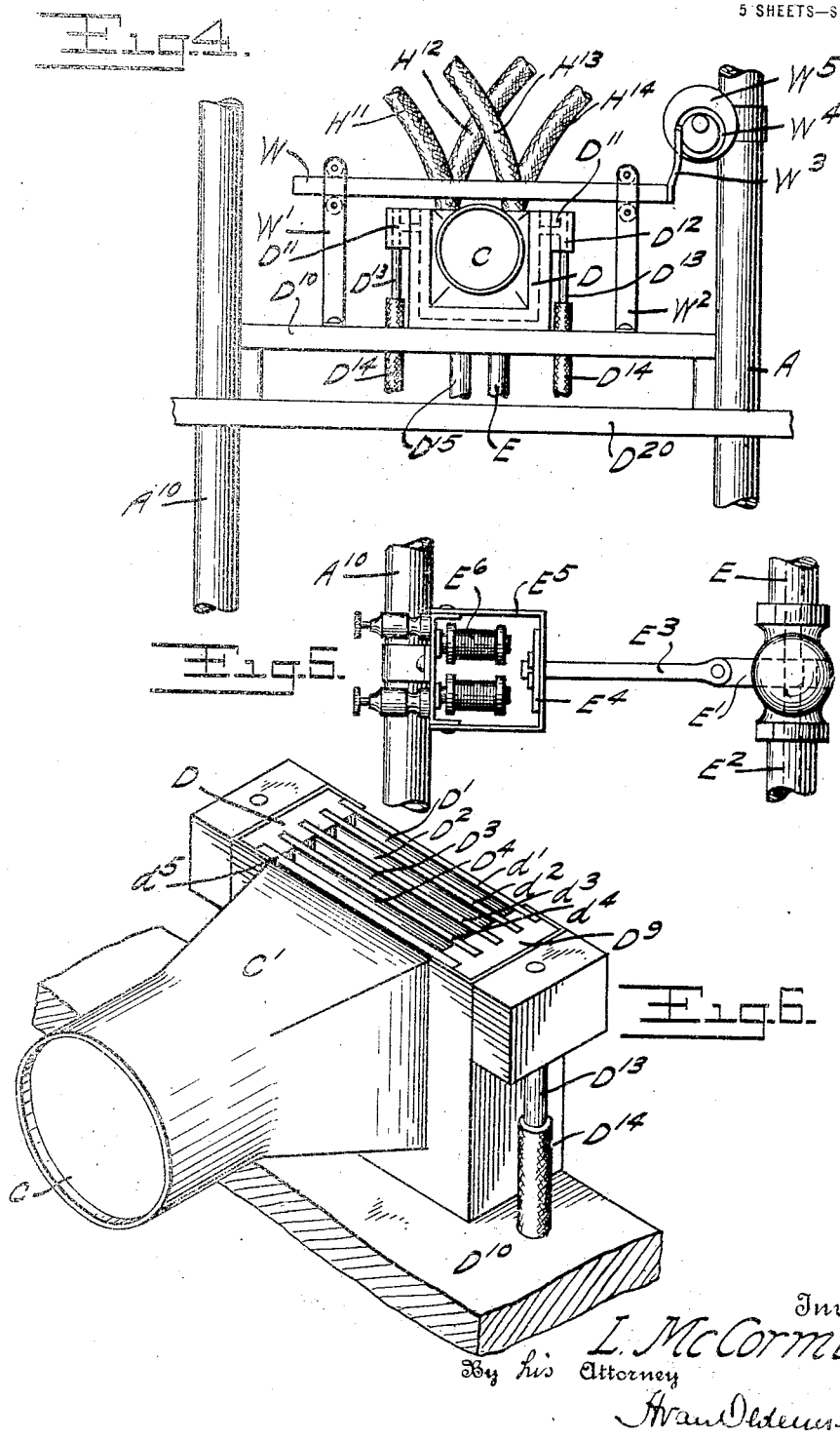

1,291,964.

Patented Jan. 21, 1919.
5 SHEETS—SHEET 5.

Inventor
L. McCormick
By his Attorney

UNITED STATES PATENT OFFICE.

LANGDON McCORMICK, OF NEW YORK, N. Y.

APPARATUS FOR CONTROLLING LIGHT EFFECTS.

1,291,964.

Specification of Letters Patent.

Patented Jan. 21, 1919.

Application filed April 12, 1917. Serial No. 161,638.

*To all whom it may concern:*

Be it known that I, LANGDON McCORMICK, a citizen of the United States of America, residing in the borough of Manhattan, city and State of New York, have invented a new and useful Apparatus for Controlling Light Effects; and I do hereby declare the following to be a full, clear, and exact description of the same.

This invention relates to apparatus for controlling light effects, and especially to that class of such apparatus in which light is projected onto a screen, sheet, or other background, and the improvements consist in means and combinations whereby the color of the projected light may be quickly changed at the will of any controlling operator.

One object of my invention is to provide an apparatus whereby any one of a plurality of light-transmitting media may be interposed, at the will of the operator, in the path of light from a projectoscope, thus permitting the color on the projected field to be varied whenever desired.

Another object of my invention is to permit any desired combination of such light-transmitting media to be interposed, so as to vary the blending or mixing, at will, of the color of the light projected onto the field.

Another object of my invention is to permit pictures (moving pictures or others) to be projected onto the colored field.

A fourth object of my invention is to provide a controlling device, especially for such an apparatus, this device being built or arranged in simulation or imitation of an organ or piano.

Figure 12:
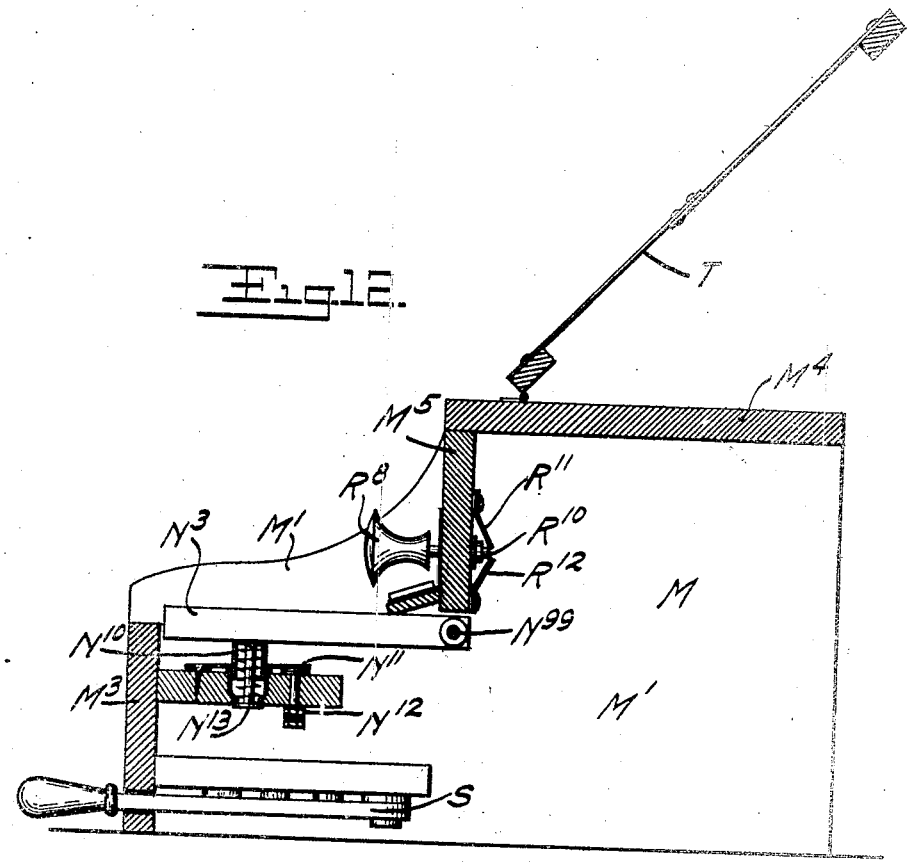
Figure 13:
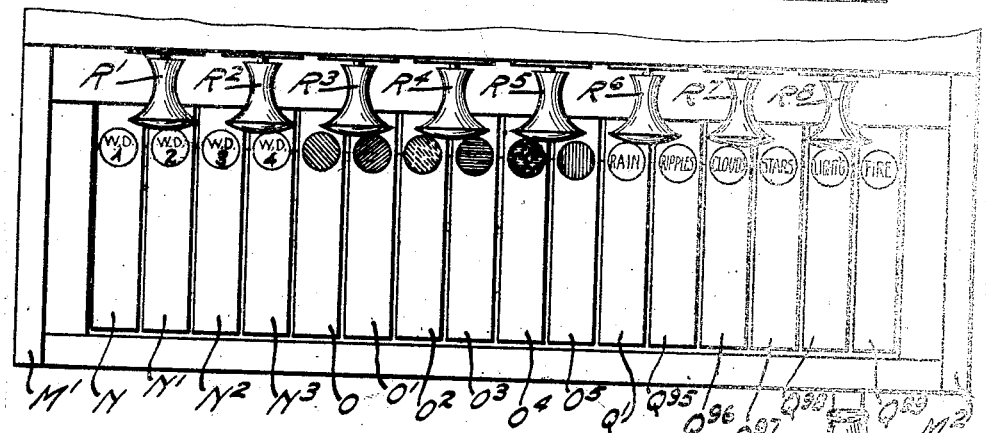

Referring to the accompanying drawings, Figure 1 is a front elevation of a preferred form of my apparatus; Fig. 2 is a side view of such an apparatus; Fig. 3 illustrates the means for controlling the supply of water from the main reservoir; Fig. 4 illustrates details of the tanks, water-supply pipes, color-supply branch pipes, color-distributers and overflow; Fig. 5 illustrates the means for controlling the water-supply branch pipes; Fig. 6 illustrates the relative arrangement of the succession of light-transmitting tanks; Figs. 7 and 8 are, respectively, front and side views of the color reservoirs and controlling means therefor; Fig. 9 is a side view of an additional projectoscope (or lantern) and mounting of the same; Fig. 10 is a side view thereof, parts having been removed to show the means for controlling the shutters; Fig. 11 shows the shutters in open position; Fig. 12 is a sectional view through a device in simulation of an organ for controlling the various mechanisms; Fig. 13 is a top view of the forward part of such controlling device showing the relative arrangement of the various switches, disposed as finger-keys and stops.

I have designated my device as a "color-tone organ" or "chromatic organ."

The illustrated apparatus may comprise a frame having front uprights A and $A^{10}$, bottom rods $A^2$ and braces $A'$, forming a light and strong frame structure, which is easily movable from place to place, especially when provided with rollers $a$. It may be strengthened with cross-rods or tubes as $A^6$, $A^7$, $A^8$ and $A^9$.

B (Fig. 2) is a projectoscope or lantern of any desired form, and this may be supported by an upright $B'$ in turn resting upon the aforesaid bottom rods $A^2$.

The front glass C of the projectoscope is carried at the forward end of a hood $C'$, and a tank structure designated (generally) as D is interposed between the projectoscope and the said hood, so that the light from the projectoscope will have to pass through the walls (which are light-transmitting) of the tank. The tank structure may have as many compartments as desired. As shown in Fig. 6, the tank structure has a succession of glass, or other transparent plates which constitute walls $d'$, $d^2$, $d^3$, $d^4$, $d^5$, arranged to provide the compartments $D'$, $D^2$, $D^3$, $D^4$ disposed in series, so that the light from the projectoscope or lantern will have to pass through the several walls in succession. The glass plates ($d'$, etc.) are seated in grooves formed in a block $D^6$, which thus forms the end walls and the bottoms of the several compartments. Each tank or compartment has overflow ports $D^{11}$ (Fig. 4) at the opposite sides near its top and these communicate with ports $D^{12}$, and pipes $D^{13}$ and $D^{14}$. At its bottom, each compartment has two discharge ports, one of which leads into a normally open pipe $D^{15}$, while the other port leads into a normally-closed pipe E. The entire tank structure is carried upon a base $D^{10}$ and the latter rests upon a board $D^{20}$ or the like, which is fitted between the uprights A and $A^{10}$.

As before stated, each tank has an open port from which a pipe E leads. Such pipe E is intended to suddenly lead water from the tank and to control such sudden discharge, the pipe is provided with a valve $E'$ (see especially Fig. 5). When closed, such valve holds the water in the tank; when open, the valve permits discharge of the water through the pipe $E^2$ and into a receptacle or large pail $E^{50}$, which removably rests upon brackets $E^{51}$ (Figs. 1 and 2) connected to the uprights A and $A^{10}$.

The valve $E'$ is shown as being electrically (mechanically) controlled. Especially referring to Fig. 5, the valve is connected to one end of a link $E^3$, the other end of which is connected with an armature $E^4$ within a frame $E^5$, the latter being secured to an upright ($A^{10}$). An electro-magnet $E^6$ is supported within said frame, and in the manner well known attracts the armature $E^4$ when current is passed through the coils of the magnet to draw the valve to open position. The valve will, as usual, be returned to the closed position by any suitable means such as a spring.

My apparatus also has means for supplying water, as it may be desired, into any desired tank or tanks $D'$—$D^4$. To assure this, the apparatus is provided with water-supply pipes corresponding in number with the tanks and each for leading water into one tank only. The supply of water may be taken from any suitable source, and, in the drawing, I have shown a reservoir F, which is removably suspended from the cross bar or tube $A^7$. An outlet pipe $F'$ leads from the bottom of said reservoir and the discharge of water through that pipe is controlled by a cock or valve $F^2$ (see Fig. 3). Such valve or cock is connected at one end of a link $F^3$, and the other end of which is connected with a slide $F^4$, the latter having a piece $F^5$ constituting an armature of an electromagnet $F^7$. The magnet, armature and slide are all supported by a frame $F^6$, which is secured to the upright $A^{10}$ of the main frame. When no current is passing through the coils of the magnet, a suitable spring (not shown) will hold the described parts in the position shown in Fig. 3; when current is passing through the coils of the magnet, the armature, slide, link and valve will be moved so that water will pass by way of the fitting G into the various branch pipes for leading the water into the several tanks or compartments ($D'$—$D^4$). There will be as many of these branch pipes as there are tanks or compartments. It has been considered necessary to show only two ($G'$ and $G^2$) of these branch pipes in Fig. 1. It is desired, of course, that the supply of water through each branch pipe shall be independent of the supply through the others, so that water may be supplied to or cut off from any tank or compartment independently. To assure this, the apparatus has a valve in each branch pipe. Each such valve may be, in construction, like that illustrated in the hereinbefore described Fig. 5, and each may be controlled by its own electromagnet $G^3$ or $G^4$ as in Fig. 1.

So far as I have described the apparatus, it will be plain that, whenever desired, water may be (upon closing of an electric circuit) led from the reservoir F thence into any of the branch supply-pipes (of which $G'$ and $G^2$ are shown) to the corresponding tank or tanks ($D'$—$D^4$), the selection of the branch pipe or branch pipes being under control of the proper electromagnet and means for closing their circuits.

As before stated, each tank has a port in its bottom and a normally-open pipe leading therefrom. It is obvious, therefore, that the quantity of water supplied into a tank must exceed that which the said open port is adapted to carry off, otherwise the tank cannot be filled. The normally-open pipe (designated as $D^{15}$ in Fig. 4) leads water into the reservoir $E^{50}$, before-mentioned.

With the arrangements such as described, a light-transmitting tank will quickly become filled, and to care for the excess of water supplied, I have provided the overflow port $D^{11}$ before mentioned. The overflowing liquid is discharged by pipes $D^{14}$ into the reservoir or pail $E^{50}$. After a light-transmitting tank has become filled, sufficient water will continue to be supplied therein to keep the desired level of liquid, and to maintain the liquid in motion. I have found, in practice, that motion of the liquid is desirable (especially when color is added as hereinafter mentioned) and that a swirling of the liquid is assured when the liquid is supplied into the tank at an angle.

When the supply of liquid (through a branch pipe) is cut off, the tank will, more or less, slowly empty through the normally-open pipe. While one tank is emptying, another tank can be filling. It is sometimes desirable to speedily empty a tank, (as, for instance, when there is to be a very quick change of color of the displayed picture), and in such case the normally-closed pipe E, which leads from the bottom of the tank, is quickly opened by manipulating its valve $E'$. Electrical connections are shown for doing this, so that the operator may take care of this from a distant point.

When it is desired to speed up the supply of water from the reservoir F into any light-transmitting tank, pressure may be applied above the water in the reservoir. For this purpose a pump $F^{10}$ (Figs. 1 and 2) carried upon the reservoir may be set in motion.

In order to vary the color of the light projected from the projectoscope or lantern B, I may, in any suitable manner, selectively interpose any suitable color or media. While my invention is not limited thereto, I prefer and I show means whereby coloring liquid substances are added to the liquid in a light-transmitting tank.

The apparatus illustrated in the drawings has four color-containing tanks, one for each light-transmitting tank; thus as an instance, color-containing tank H' may correspond to and supply coloring liquid into a light-transmitting tank D'; color-containing tank $H^2$ may correspond to and supply coloring liquid into the light-transmitting tank $D^2$; color-containing tank $H^3$ may correspond to and supply coloring liquid into the light-transmitting tank $D^3$, and color-containing tank $H^4$ may correspond to and supply coloring liquid into the light-transmitting tank $D^4$. Of course, the coloring substance in the tank $H'$—$H^4$ should differ in color; thus, H' may contain liquid of a reddish color, and $H^2$ may contain liquid of a yellowish color.

Coloring liquid is led from the color-containing tanks by means of flexible pipes $H^{11}$, $H^{12}$, $H^{13}$ and $H^{14}$, the first of which delivers the coloring liquid into the light-transmitting tank D', while $H^{12}$ leads coloring liquid into light-transmitting tank $D^2$. $H^{13}$ leads coloring liquid into light-transmitting tank $D^3$, and $H^{14}$ leads coloring liquid into light-transmitting tank $D^4$.

Discharge of coloring liquid into a flexible pipe is through a port $H^{20}$ (Figs. 7 and 8), and is controlled by a cock or valve $H^{21}$, which is connected to a rod $H^{22}$, having a piece $H^{23}$ at its upper end, this piece constituting an armature for an electromagnet $H^{25}$. When such magnet is energized the armature is attracted and the valve is drawn to an open position; when the magnet is out of circuit, a spring $H^{26}$ moves the armature, rod and valve to the closing position shown in Figs. 7 and 8. With the arrangement shown, it is possible for an operator to control the supply of coloring substance to the light-transmitting tanks, and to do this by manipulation of switches at more or less distant points.

The addition of coloring substance to water within the light-transmitting tank will, of course, change the color of the water. It is obvious also that the color of the water within a light-transmitting tank may be made dark, light or medium according to the quantity of coloring substance supplied into the water and the duration of supply of coloring liquid. Again, it is obvious that coloring substance of two different colors may be supplied simultaneously into different tanks, and that the resulting color, tint or blend will depend upon the colors and quantity which has been supplied into the light-transmitting tanks and upon the proportions.

My invention contemplates control of the various devices hereinbefore mentioned from a distant point, for instance, by means of switches, which will open and close electric circuits including the electromagnets before mentioned. The controlling will be under the will of an operator, and in practice such operator has used a keyboard somewhat of the kind hereinafter described, and which resembles an organ, having finger keys and stops, the operation of which open and close the necessary switches. Thus, for instance, movement of the finger keys and stops (and consequently of the like switches) may be as prearranged by colored or other signs or symbols upon a sheet of musical composition. Thus, the sheet may have, at points resulting from experimental demonstration, red signs, and at those points in the rendering of the musical composition, the proper finger-keys or stops will be moved to close the circuit which controls the delivery of the reddish coloring substance into the corresponding light-transmitting tank. Simultaneously, the operation of the finger-keys or stops at the imitation organ may control the supply of water to a light-transmitting tank, or the high speed discharge of water therefrom, as well as the operation of a finger key, stop or other switch may set in operation, or vary the speed thereof, the pump $F^{10}$ to vary the speed of supply of water to a light-transmitting tank. The structures of Figs. 1 and 2 may be portable, and there may be means arranged for detachable arrangement with the organ structure or other switch structure. For instance, a cable X (Fig. 2) may run from the switch structure and to a separable socket or connection $X^2$, from which there will run any usual cable X' which includes the conductors for controlling the various electromagnets hereinbefore mentioned.

The structures and arrangements already described will permit light of any color or shade to be thrown, by the projectoscope or lantern B, on to a suitable screen or ground, and to vary the color or shade as desired.

It is desirable to project pictures upon the colored fields thrown as aforesaid upon the screen or ground. To enable this to be done, I have provided my apparatus with one or more different projectoscopes or lanterns. There may be any number of these. In Fig. 1, I have shown six additional projectoscopes which are designated as J', $J^{95}$, $J^{96}$, $J^{97}$, $J^{98}$, $J^{99}$. The additional projectoscopes may be designed to throw motion pictures onto the colored field. Thus, J' may throw a picture of a rain on the colored field; J$^{95}$ may throw a picture of ripples; J$^{96}$ may throw a picture of clouds; J$^{97}$ may throw a picture of stars; J$^{98}$ may throw a picture of lightning; J$^{99}$ may throw a picture of fire. Obviously the additional projectoscopes or lanterns may be used in optional combinations: as for instance, J', J$^{96}$ and J$^{98}$ used together will throw a combined picture representing clouds, rain falling and lightning breaking through the clouds.

The operation of each additional projectoscope or lantern desirably be under the control of the operator at the imitation organ or other switch structure, and to enable this distant control to be effected, I have provided each additional projectoscope with a motor (a spring driven motor for instance) and an electro-magnet for releasing and stopping the motor. Conductors run from the distant point (organ or other control means) to each additional projectoscope, and these conductors may be included within the cable X, detachable plug socket X$^2$ and the cable X' all before referred to.

The form shown in Figs. 1 and 2 is provided with as many arms A$^{20}$, A$^{21}$, A$^{22}$, A$^{23}$, A$^{24}$, A$^{25}$, as there are additional projectoscopes or lanterns, the arrangement of these arms being such that there is plenty of room between the various projectoscopes to permit access to and repair of each without disturbing the others. It will be understood, of course, that the various additional projectoscopes are so inclined or turned that the light from each may be thrown upon the field of light projected from the main projectoscope lens C.

At its outer end, each of the arms (A$^{20}$—A$^{25}$) is provided with a forwardly and upwardly inclined brace arm J$^{90}$ (Figs. 2, 9 and 10), and the separate additional projectoscope is connected to the upper end of such brace arm. Each additional projectoscope may have, as usual, the lens tube J$^2$, light casing J$^3$, socket box J$^4$, with the usual conductors J$^5$ leading into the socket box. Each additional projectoscope may also have any form of clockwork or other motor provided with a driving fly or governor L'; it may also have shutters, as usual, to permit light to pass from the casing J$^3$ through the tube J$^2$ and for cutting off such light as desired.

The illustrated mechanism for operating the shutters comprises two arms K' and K$^2$ at opposite sides of the tube, each being pivoted at K$^{20}$. The lower ends of these arms are of such material that they will be attracted by electro-magnets L which are carried upon the casing, and against the pull of a spring K$^{10}$ which is connected to the upper ends of both arms. The shutter itself is shown as consisting of two oppositely-facing leaves K$^3$, K$^4$, these being connected to the arms K' and K$^2$ above the pivots thereof. When the magnets are energized, the shutters are (Fig. 11) drawn apart to permit light to pass between them. When the magnets are out of circuit, the spring K$^{10}$ draws the shutters together to shut off the light. The shutters may be provided with teeth K$^5$ and K$^6$ to cause a tight joining of the same when drawn together.

One arm (K') is provided with an inwardly projecting stop K$^{16}$ (Fig. 10), which is in the path of the fly L' of the motor, when the shutters are closed, and then serves to stop the movement of the motor. When the shutters are drawn apart, the stop K$^{16}$ is out of the path of movement of the fly L' and permits the motor to run unrestrictedly.

By the means shown, an operator (at a more or less distant point) is enabled to control the projection of pictures from each additional projectoscope or lantern, and also to control the operation of the motor of each such projectoscope. It will be understood, of course, that such operator will be provided with any usual connections whereby he can selectively control any one or any combination of the additional projectoscopes.

Hereinbefore I have described the arrangement whereby coloring substance is supplied from the tanks H'—H$^4$ into the light-transmitting tanks D. I have found it desirable, during the supply of the coloring substance into the water, to move the delivery ends of the tubes, having found that the coloring substance more rapidly distributes itself through the water under the circumstances. In Figs. 1 and 4, I have shown means for assuring this result. The tubes H$^{11}$—H$^{14}$ each come from, respectively, the tanks H'—H$^4$, and each of these discharges coloring substance into only one of the light-transmitting tanks. The ends of these tubes are fitted through opening of a slide W, these openings being of such shape or size as to compel the ends of the tubes to be moved (upon movement of the slide) crosswise of the tank. The slide is supported at the upper ends of brackets W' and W$^2$. At one end the slide carries an arm W$^3$ which has a pin or the like, fitting the eccentric groove W$^4$ of a rotatable disk W$^5$. The disk may be driven by any suitable motor, such as a spring wound motor, and may be run during the entire use of the machine to cause a uniform and constant back and forth movement of the slide W.

Hereinbefore I have spoken of a switch apparatus in simulation or imitation of an organ. Such device is shown especially in Figs. 12 and 13, in which M indicates a box-like body of the organ, and M' and M$^2$ indicate the sides thereof. M$^3$ indicates the front of the box, and $M^4$ indicates its top. $M^5$ indicates the stop board or board through which stops are movably mounted as hereinafter described.

The illustrated device has a plurality of finger-keys $N$—$N^3$, $O$—$O^5$, $Q'$—$Q^{99}$, which resemble the keys of an organ or of a piano. The device also has a plurality of stops $R'$—$R^8$ resembling organ stops. Each of said parts (finger-keys or stops) is intended to manipulate switches which open and close circuits which include the various electro-magnets hereinbefore mentioned.

Each finger-key may close a circuit by bringing a strip $N^{11}$ against a contact $N^{12}$. Upon release of the finger-key, it is restored to its upper position by means of a spring $N^{10}$ pressing against the plate $N^{13}$ (Fig. 12). Each stop is adapted to be pushed rearwardly and pulled forwardly. In its rearward position it moves a carried contact $R^{10}$ into position to bridge spring contacts $R^{11}$ and $R^{12}$ and close the circuit therethrough. $S$ is a main switch for starting the entire apparatus, or for lighting the various lamps in the various projectoscopes (lanterns).

As I have shown, the finger-keys are divided into groups. One group comprises the keys $N$—$N'$—$N^2$—$N^3$, of which $N$ may be used for closing the circuit through the magnet $E^4$ of the water discharge pipe of the light-transmitting tank $D'$, to cause the sudden discharge of water from that tank; key $N'$ is intended to close the circuit and control the discharge of water from the light-transmitting tank $D^2$; key $N^2$ is intended to close the circuit of the magnet which effects the sudden discharge of water from the light-transmitting tank $D^3$, while key $N^3$ is intended to close the circuit of the magnet controlling the sudden discharge of water from the light-transmitting tank $D^4$.

A second group of finger-keys comprises those indicated as $O$—$O^5$, of which $O$ may be employed to close the circuit through an electro-magnet $H^{25}$ of the color tank $H'$; $O'$ may be used to close the circuit of the electro-magnet of the tank $H^2$; finger-key $O^2$ may be employed to close the circuit of the color tank $H^3$, and finger-key $O^4$ may be employed to close the circuit in color tank $H^4$; or finger-keys $O^4$ and $O^5$ may be used to close any two of the said circuits so as to feed color from two of the color-tanks into two of the light-transmitting tanks.

A third group of finger-keys comprises those lettered $Q'$—$Q^{99}$. Of these, $Q'$ may be used to close the circuit through an electro-magnet $L$ of the additional projectoscope $J'$ beforementioned; the finger-key $Q^{95}$ may be used to close the circuit of the electro-magnet of the additional projectoscope $J^{00}$; the finger-key $Q^{96}$ may be used to close the circuit of the electro-magnet of the additional projectoscope $J^{96}$; the finger-key $Q^{97}$ may be used to close the circuit of the magnet of the additional projectoscope $J^{97}$; the finger-key $Q^{98}$ may be used to close the circuit of the electromagnet of the additional projectoscope $J^{98}$, while the finger-key $Q^{99}$ may be used to close the circuit of the electro-magnet of the additional projectoscope $J^{99}$.

It will be understood, of course, that the various keys may be pressed in any desired combinations, so that it is possible, as an instance, to simultaneously cause the discharge of water from one or more of the light-transmitting tanks, the supplying of coloring substance to one or more of the other light-transmitting tanks and the projection from one or more of the additional projectoscopes onto the colored field of light projected from the main projectoscope B.

The stops in the switch structure are indicated as $R'$—$R^8$. These may be used to close circuits for any purpose, for instance, as additional to or as substitute for some of the finger-keys or for other purposes.

In practice, an operator may place a guide upon a support $T$ (Fig. 12). Said guide may be a sheet of musical composition, having added thereto, at desired points and as pre-arranged, suitable signals or symbols. As the musical composition is rendered, the operator, by pressing the finger-keys or pulling or pressing the stops, may cause the machine of Figs. 1 and 2, etc., to project the field of light of the desired color upon the screen or ground, to vary the color or shade as desired, and to throw pictures thereon from the various additional projectoscopes.

I claim:

1. In an apparatus for controlling light effects, a projectoscope, a tank having light-transmitting walls in front of the said projectoscope, a second tank, means for supplying water from the first tank to the second, and a pump carried by the second tank for compressing air therein above the contained water.

2. In an apparatus for controlling light effects, a projectoscope, a tank having light-transmitting walls in front of the said projectoscope, means for supplying water into said tank, means for varying the speed of the supply of water, and a controller for the last-mentioned means.

3. In an apparatus for controlling light effects, a projectoscope, a tank having light-transmitting walls in front of the said projectoscope, and means for controlling the quantity of water supplied into said tank, the latter having a normally open port near its bottom for leading water therefrom.

4. In an apparatus for controlling light effects, a projectoscope, a tank having light-transmitting walls in front of the said projectoscope, and means for supplying water into said tank, said tank having two ports near its bottom, one of said ports being normally open and the other being normally closed, and means for opening the second-mentioned port as desired.

5. In an apparatus for controlling light effects, a projectoscope, a tank having light-transmitting walls in front of the said projectoscope, and means for supplying water into said tank, said tank having two ports near the bottom, one normally open and the other normally closed, and an electro-magnet and means controlled thereby for opening the second-mentioned port as desired.

6. In an apparatus for controlling light effects, a projectoscope, a tank having light-transmitting walls in front of the said projectoscope, and means for supplying water into said tank, said tank having a normally-open port near its bottom for leading water therefrom and also having an overflow port in one side thereof near its top.

7. In an apparatus for controlling light effects, a projectoscope, a tank having translucent walls in front of the said projectoscope, means for supplying water into said tank, means for varying the speed of the supply of water, electrical connections for operating both said means and manually operable circuit closers in circuit with said electrical connections.

8. In an apparatus for controlling light effects, a projectoscope, a series of tanks each having light-transmitting walls and with the walls of the several tanks disposed in succession in front of said projectoscope, and means for selectively supplying water into any of said tanks, said means including valves and corresponding electro-magnet for operating the valves, and a controller having a plurality of selectively operable circuit-closers each in circuit with one of said electro-magnets.

9. In an apparatus for controlling light effects, a projectoscope, a tank having light-transmitting walls in front of the said projectoscope, means for supplying water into said tank, means for leading surplus of water, and separate means for causing a rapid discharge of water from the tank.

10. In an apparatus for controlling light effects, a projectoscope, a tank having light-transmitting walls in front of the said projectoscope, a pipe for supplying water into said tank, and a normally open port near the bottom of the tank and out of alinement with the supply pipe, to contribute a whirling motion to water within the tank.

11. In an apparatus for controlling light effects, a projectoscope, a tank having light-transmitting walls in front of the said projectoscope, means for supplying water into said tank, and means for independently supplying coloring material into the supplied water.

12. In an apparatus for controlling light effects, a projectoscope, a tank having light-transmitting walls in front of the said projectoscope, means for supplying water into said tank, a container for liquid coloring material and a tube leading liquid from said container into the tank.

13. In an apparatus for controlling light effects, a projectoscope, a tank having light-transmitting walls in front of the said projectoscope, means for supplying water into said tank, means for independently supplying coloring material into the supplied water, and a controller for both said means.

14. In an apparatus for controlling light effects, a projectoscope, a tank having light-transmitting walls in front of the said projectoscope, means for supplying water into said tank, and means for independently supplying coloring material into the supplied water, said means including a valve and an electro-magnet for operating the valve.

15. In an apparatus for controlling light effects, a projectoscope, a tank having light-transmitting walls in front of the said projectoscope, means for supplying water into said tank, means for independently supplying coloring material into the supplied water, said means including a valve, an electro-magnet for operating the valve, and a manually-operable circuit-closer in circuit with said electro-magnet.

16. In an apparatus for controlling light effects, a projectoscope, a tank having light-transmitting walls in front of the said projectoscope, means for supplying water into said tank, a plurality of containers for liquid coloring material, and means, one for each container, for selectively controlling the supply of coloring liquid from said container into the supplied water.

17. In an apparatus for controlling light effects, a projectoscope, a tank having light-transmitting walls in front of said projectoscope, means for supplying water into said tank, a plurality of containers for liquid coloring material, and electro-magnets and means operable thereby for selectively controlling the supply of coloring liquid from said containers into said tank.

18. In an apparatus for controlling light effects, a projectoscope, a series of tanks, each having light-transmitting walls and with the walls of the several tanks in series in front of said projectoscope, means for supplying water into any of said tanks, a plurality of containers for liquid coloring material, the containers being arranged in groups corresponding in number to that of the tanks, and means for selectively controlling the supply of coloring material from any container of a group into the corresponding tank.

19. In an apparatus for controlling light effects, a projectoscope, a tank having light-transmitting walls in front of the said projectoscope, means for supplying water into said tank, a separate projectoscope and connections for controlling the operation of any of the aforesaid means individually or in combination.

20. In an apparatus for controlling light effects, a projectoscope, a tank having light-transmitting walls in front of the said projectoscope, means for supplying water into said tank, means for independently supplying coloring material into the supplied water, a separate projectoscope, and connections for controlling the operation of any of the aforesaid means individually or in any desired combination.

21. In an apparatus for controlling light effects, a projectoscope, a tank having light-transmitting walls in front of the said projectoscope, means for supplying water into said tank, a container for liquid coloring material, a tube leading liquid from said container to the tank, and means for moving the discharge end of the tube.

22. In an apparatus for controlling light effects, a projectoscope, a tank having light-transmitting walls in front of the said projectoscope, means for supplying water into said tank, and means for independently supplying and scattering coloring material into the supplied water.

23. In an apparatus for controlling light effects, a projectoscope, a tank having light-transmitting walls in front of the said projectoscope, means for supplying water into said tank, a container for liquid coloring material, a tube for leading liquid from said container to the tank, a movable part near the tank and movably carrying the discharge end of the tube, and a motor and connections for moving said part.

24. In an apparatus for controlling light effects, a projectoscope, a tank having light-transmitting walls in front of the projectoscope, means for supplying water into said tank, and means for independently supplying coloring material into the supplied water, all the before-mentioned parts being mounted on and in combination with a portable frame.

25. In an apparatus for controlling light effects, a projectoscope, means for selectively interposing one of a plurality of colored light-transmitting media in the light from the said projectoscope said means comprising a controller having a plurality of finger-keys, one for each color, and an additional projectoscope, said controller also having a circuit-closer in circuit with the additional projectoscope.

26. In an apparatus for controlling light effects, a projectoscope, means for selectively interposing one of a plurality of colored light-transmitting media in the light from said projectoscope, and a portable frame carrying all the before-mentioned parts, a controller constructed in simulation of an organ and having a plurality of finger-keys and a plurality of slides simulating stops, circuit-closers operable by said finger-keys and circuit-closers operable by said stops, said controller being capable of detachable connection with the parts mounted on said frame.

In testimony whereof, I have signed my name to this specification in the presence of two subscribing witnesses.

LANGDON McCORMICK.

Witnesses:
H. J. S. BEVERLY,
MARIE B. BERLER.